May 7, 1963  E. BRICHARD ET AL  3,088,850
PROCESS AND APPARATUS FOR OBTAINING ELECTRICALLY CONDUCTIVE
COATINGS ON THE SURFACE OF OBJECTS CONSISTING
OF GLASS OR CERAMIC MATERIALS

Filed Sept. 12, 1958  2 Sheets-Sheet 1

INVENTORS
Edgard Brichard
Emile Plumat
Gerard Meunier
Edouard Deliere
BY Corey, Hart & Stemple
  Attorneys May 7, 1963  E. BRICHARD ET AL  3,088,850
PROCESS AND APPARATUS FOR OBTAINING ELECTRICALLY CONDUCTIVE
COATINGS ON THE SURFACE OF OBJECTS CONSISTING
OF GLASS OR CERAMIC MATERIALS
Filed Sept. 12, 1958  2 Sheets-Sheet 2
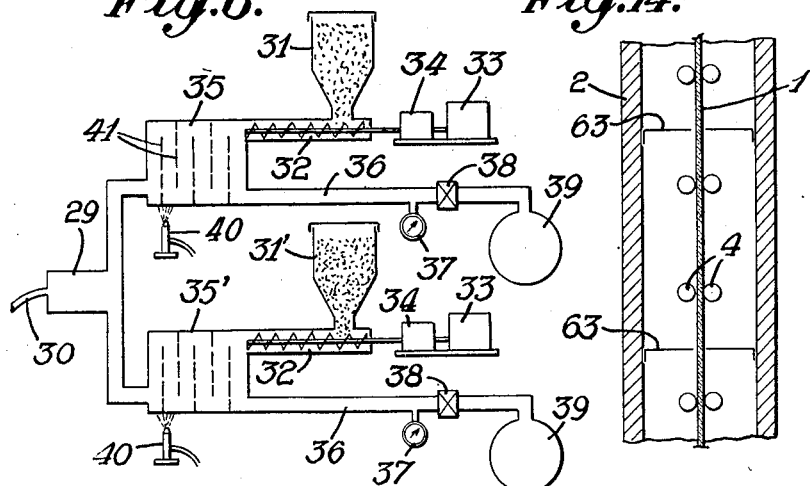
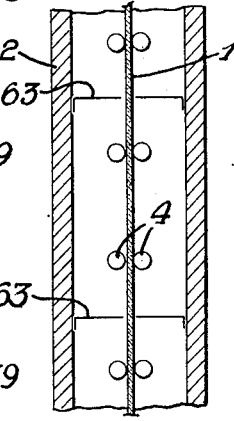
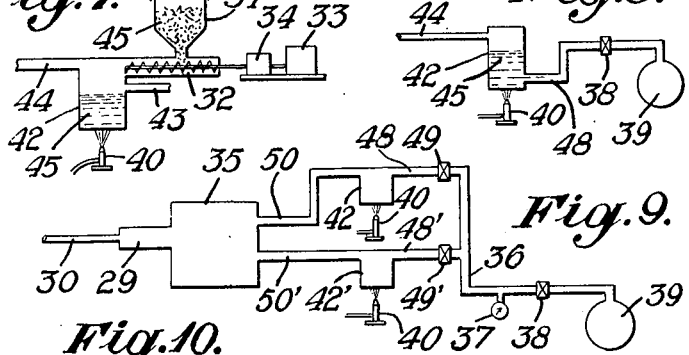
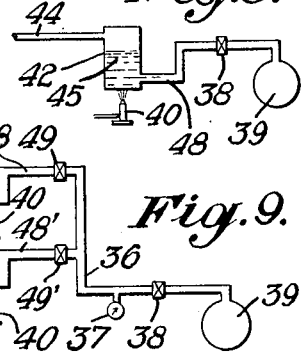
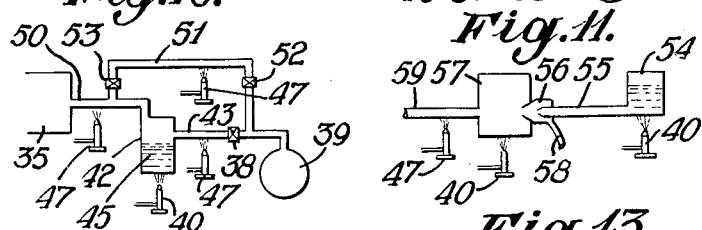
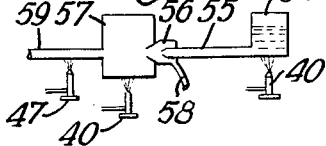
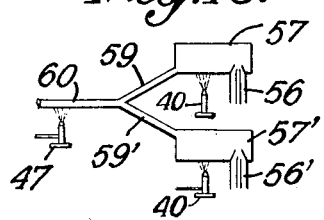
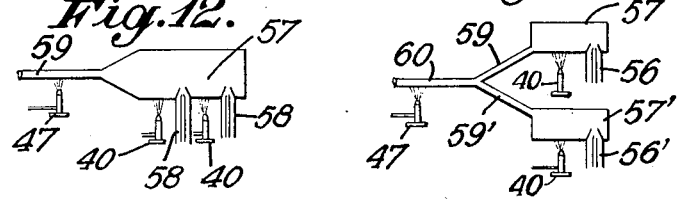
INVENTORS
Edgard Brichard
Emile Plumat
Gerard Meunier
Edouard Deliere
By Corey, Hart & Stemple
Attorneys 3,088,850
PROCESS AND APPARATUS FOR OBTAINING ELECTRICALLY CONDUCTIVE COATINGS ON THE SURFACE OF OBJECTS CONSISTING OF GLASS OR CERAMIC MATERIALS
Edgard Brichard, Jumet, Emile Plumat, Gilly, Gérard Meunier, Jumet, and Edouard Deliere, Marcinelle, Belgium, assignors to Union des Verreries Mecaniques Belges, Societe Anonyme, Charleroi, Belgium, a Belgian company
Filed Sept. 12, 1958, Ser. No. 760,651
Claims priority, application Belgium Sept. 17, 1957
12 Claims. (Cl. 117—211)

The present invention relates to a process and an apparatus for obtaining, on the surface of objects consisting of glass or ceramic material, stable, transparent and generally substantially invisible electrically conductive coatings and also products obtained by the process.

Processes for depositing thin electrically conductive coatings on glass by treating the support, which has previously been brought to an appropriate temperature, with the aid of halides and other salts of certain metals, more especially of tin, which are generally applied by spraying or vaporization, are known. There are thus obtained what are usually called iridescent coatings or films, by reason of the appearance which the treated products can acquire under interference effects which are set up when they are examined under reflected light, even though it is generally endeavored to obtain these coatings in as regular a form as possible and without any clearly visible iridescent tints.

The known processes for obtaining electrically conductive coatings have many disadvantages, notably the impairment of the transparency of the treated products owing to the formation of fogging and streaks, which are particularly detrimental in the case of glass, the iridescent effect giving very marked colorations in reflected light especially when the electrical resistance is relatively low, the difficulty in producing coatings of low resistivity, for example less than 100 ohms per square surface, the lack of uniformity in the thickness of the coatings and consequently in the resistivity, the danger of flaking on the coatings, the difficulty in obtaining coatings unaffected by heat and chemical products, and finally the high cost of the product obtained.

For obtaining an electrically conductive coating, it is also known to project on to the surface of the previously heated object to be treated a metallic salt which readily decomposes under the action of high temperature and of an oxidizing agent such as the oxygen of the air. The metallic salt is converted into an oxygenated compound during and after its incrustation into the hot surface and is deposited on the zone of incrustation on the surface. An oxide of the metal is formed under topochemical conditions which promote the distribution of the deposited material in the form of a crystal lattice which has the known characteristics required to form an electrical semiconductor, that is to say, gaps and other deformations. The metal generally employed is tin in the form of a halide, more especially a chloride, although a number of other metals have already been proposed. It has also been proposed to use simultaneously a plurality of metals or to add non-metallic compounds, but in this case one of the metals is always in a sufficiently reduced quantity in relation to the other, just as in the case of non-metallic compounds which are generally added only in relatively small quantities. These adjuvants, among which there may be mentioned by way of example compounds of fluorine, vanadium, cobalt, zinc, cadmium, indium, antimony, tellurium and tungsten, influence the properties of electrically conductive coatings, probably by promoting the deposition of the material in the form of a crystal lattice appropriate for the formation of semi-conductors.

The products of the treatment—hereinafter called "active product" regardless of their composition and of whether they do or do not contain adjuvants, are generally employed in the known processes by spraying or vaporizing with the aid of a current of gas solutions of hydrolytic salts or fused salts in their water of crystallization or otherwise, on the surface to be treated. The presence of a quantity of water has been considered essential and it has been proposed to moisten the current of air when employing non-aqueous solutions or anhydrous liquid substances such as tin tetrachloride, which is generally employed in the form of its tetrahydrate.

The inventors have found that the presence of water is generally prejudicial to the production of a high-grade product.

In the process according to the invention, the active product employed in the formation of the electrically conductive coating is used in the anhydrous state and brought into contact with the object to be treated by means of one or more dry currents of gas. This process obviates the disadvantages hereinbefore described and permits of obtaining in regular, continuous and prolonged manufacture very transparent electrically conductive coatings which are free from fogging or streaks and do not give any distinct coloration in reflected light. The coatings adhere strongly to the support, are completely resistant to heat and to chemical products and have regular thickness over the entire extent of the surface and consequently uniform electrical resistivity throughout, which latter property may be chosen as desired within very wide limits, from very low values, less than 100 ohms per square surface.

For carrying out the process according to the invention, active products are particularly suitable which contain compounds, more especially halides, chosen from a group including the elements tin, antimony and tellurium, with which ammonium halides may be associated. An active product based on a tin halide is advantageously employed in the presence of an adjuvant formed of a fluoride chosen from the group of elements including the elements antimony and tellurium, or based on an oxide of these elements in the presence of an aliquot quantity of an ammonium fluoride, this adjuvant preferably being limited to 0.1 to 10 parts per 100 parts of tin halide.

The gas carrying the active product may be a dry current of air, but it is advantageous to choose an inert gas, such as nitrogen, carbon dioxide, argon or neon, or combustion gases free from water vapors, or again combustible gases producing no water vapors during combustion.

For the purpose of producing objects provided on their surface with an electrically conductive coating invariably having the desired properties during continuous manufacture, it is desirable to apply a number of measures, one of the most important of which concerns the ready adjustment of the quantity of active products projected on to the said surface. This adjustment is preferably effected by controlling the supply of substances forming the active product when they are in the solid anhydrous state or in the liquid anhydrous state. In the case of solid substances, these undergo a complete drying, are finely pulverized and are introduced into the closed receptacle of a distributor whose delivery is effected by any appropriate device, for example by means of a vibrating feeder, or advantageously by means of a worm turning at a speed which may be adjusted as required. The supply of anhydrous substances which are in liquid form at ambient temperature may be controlled with the aid of an injector having an adjustable needle valve or by a variable-delivery pump, or a generator directly providing a regulatable supply, or by any other appropriate device.

When the constituents of the active product are solid, a mixture is prepared in which they are contained in the desired proportions and the required quantity of the mixture is made available to a current of carrier gas through a distributing device. In some cases, notably when undesirable intermediate reactions between the constituents are to be feared, it is advantageous, to mix only some of the constituents, for example the adjuvants, and to feed them through a separate distributor, one or more distributors then supplying the other components, or again to provide a separate distributor for each of the constituents. The various distributors feed either a single current of gas or a plurality of currents of gas of like or different nature, or may each supply a separate current of gas. When a current of gas is fed through a plurality of distributors, these may operate continuously, each at an appropriate speed for giving the active product the required composition, or merely intermittently, for example one after the other for a period of time depending upon a predetermined program. When the constituents of the active product are introduced into a plurality of currents of gas, the speeds of the latter are so adjusted that the active product coming into contact with the object to be treated has the desired composition at each instant. The various currents of gas each carrying a part of the active product advantageously converge in a mixing chamber, from which they are directed in a single current of gas on to the object to be treated, but if it is desired to obviate all possibility of an intermediate reaction it is preferable to feed them separately to the object to be treated.

The constituents of the active product, fed by one or more distributors, encounter the current of gas which will serve to carry them into a vaporization chamber heated to a temperature such that the vapor pressures of these constituents enable them to pass into the current of gas. It is advantageous to regulate the supply of active products, the speed of the current of gas and the temperature of the vaporization chamber in such manner that this chamber contains only the quantity of active product which is intended to be immediately taken up by the current of gas.

When the melting point of the constituents of the active product is sufficiently low in the anhydrous state to enable them to be readily used in the liquid state, it is frequently advantageous to pass a current of gas through a receptacle containing one or more constituents of the active product, the temperature of the receptacle being so adjusted that its contents are in the liquid state and have an appropriate vapor pressure. The constituents of the active product may be introduced into the liquefaction receptacle by means of one or more distributors so regulated as to maintain the level of the liquid substances between desired limits, and a liquefaction receptacle may be provided for each constituent or group of constituents or for all the constituents of the active product. Depending upon the value of the vapor pressure of the contents of a liquefaction receptacle at the temperature at which this receptacle is to operate, the current of gas is introduced into it either above or below the level of the liquid. The current of gas introduced into the liquefaction receptacle may be a mixture of combustible gases which do not give water-vapors during their combustion. The heat evolved by the combustion of this gas within the receptacle brings the latter to the temperature necessary for maintaining its contents in the molten condition. Since the quantity of gas which is to be passed through the liquefaction receptacle in order to become charged with the required quantity of active product may be smaller than that necessary for forming the current of gas, the current leaving the receptacle may be diluted with gas free from active product, which is fed, for example, by means of a branch pipe provided with regulating valves and connected to the gas conduit at the inlet and outlet of the liquefaction receptacle.

It is obvious that an installation may comprise the devices necessary for simultaneously employing anhydrous solid constituents fed by means of worm-type distributors and constituents employed in the liquid or molten state. Regardless of the variant of the process employed, it is necessary to prevent the temperature of the vaporization chamber or of the liquefaction receptacle from being lowered by the passage of a large quantity of cold gas. For this purpose, the gases are heated before encountering the active product or one or more of its constituents, and in order to prevent even a partial condensation of components of the active product during the conveyance of the active product between the liquefaction receptacle or the vaporization chamber at the surface to be treated, the current or currents of gas serving as a carrier means are maintained at a temperature above the condensation temperature of one of the compounds of the active product.

When the currents of carrier gas for the active product consist essentially of inert gases, the currents of gas directed on to the object to be treated comprise a current of oxidizing gases, for example a current of oxygen, acting in situ with the active product for forming on the surface of the object to be treated an electrically conductive oxide which is strongly bound to its support.

The properties of the coating also depend to a large extent upon certain steps applied in the reaction zone. While it is known that the object to be treated must be heated to a temperature close to the softening temperature of the material, the process according to the invention utilises the new observations that the active product and the current of gas must come into contact with the object only when the latter is undergoing slow cooling and that the gases with the active product not retained on the surface of the object must remain close to the treated surface during the cooling of the object to a temperature between 150° and 350° C., the duration of this stay being advantageously adjustable. In addition, it is desirable that the object to be treated should be protected from turbulent convection currents during the formation of the electrically conductive coating and the cooling. For this purpose, the reaction zone is advantageously separated from the adjacent zones by curtains or screens, of which the upstream one preferably consists of a current of inert gas which is directed transversely towards the surface of the object and prevents the active product and its carrier gas from spreading towards the highest heat zone, while the downstream curtain or screen is formed of solid baffles disposed at a variable inclination, through which the gas and the active product not used in the formation of the electrically conductive coating are discharged after the cooling of the treated object.

The apparatus for carrying out the process according to the invention comprises means known per se for introducing into and displacing in the reaction zone the object to be treated, which has been previously heated as hereinbefore stated, means for directing on to the surface of the object one or more currents of gas carrying the active product and at least one current of oxidizing gas, a device for imparting to the said directing means reciprocating movements perpendicular to the direction of advance of the object, so that there results from the co-operation of the various movements a uniform treatment of the surface of the object, devices for isolating the adjacent zones from the treatment zone and for adjusting the period of residence of the currents of gas in this zone, as also devices for charging one or more currents of gas with active product or constituents of the latter and one or more devices for adjusting the quantity of substances made available to the current or currents of gas and the temperature of the latter.

The members for directing the current or currents of gas carrying the active product on to the surface of the object comprise, for each current of gas, a bank of nozzles disposed at the end of a rigid conduit mounted on a reciprocating device and a connection to a flexible feed pipe. Also mounted on the reciprocating device in the same manner is a bank of nozzles fed with oxidizing gas. The nozzles of the various banks for the current of carrier gas converge between that part of the surface which is to be treated, so that this part of the surface constitutes a fairly narrow strip parallel to the banks, while the nozzles of the oxidizing bank can be adjusted at will so that their jets form an impact strip whose width is identical to or different from that of the first strip and situated on or in the first strip or more or less to the side thereof. The distance between the mouths of the nozzles and the surface of the object is adjustable and is between 2 and 15 centimetres in the case of the nozzles of the banks for the currents of carrier gas and between 2 and 8 centimetres for the nozzles of the oxidizing gas bank.

For charging a current of gas with active product or with one of its constituents, various procedures may be adopted, depending upon whether the mixture of the substances or the substances themselves become liquefied at a more or less high temperature and whether their vapor pressure is higher or lower. Thus, for substances having a high melting point, above about 250 to 300° C., and for all substances which tend to sublime, it is indicated to provide one or more vaporization chambers each provided with a heating means for vaporizing the substances forming the active product or one or more of its constituents, with baffles for prolonging the path of the gas during which it becomes charged with vapors, with a gas inlet pipe, with an outlet pipe connected to the flexible pipe of the reciprocating device, and with one or, if desired, more devices for adjusting the quantity of solid substances introduced into the said chamber.

If, on the other hand, the substances have a low melting point, it is advantageous to provide one or more liquefaction receptacles, each provided with a heating means for liquefying the substances forming the active product or one or more of its constituents and for maintaining them at a temperature at which their vapor pressure reaches a predetermined value, with one or more gas inlet pipes, with an outlet pipe for gas charged with vapors of the substances, directly or indirectly connected to the flexible pipe of the reciprocating device, and with one or more devices for adjusting the quantity of substance introduced into the said receptacle. Depending upon the value of the vapor pressure of the substances, the pipe for the admission of the current of gas is disposed either in the upper part of the receptacle, so that the current of gas encounters therein the active product or one or more of its constituents when the latter are in the form of vapor, or very close to the bottom of the receptacle in order that the current of gas may become charged with vapors of the active product or of one or more of its constituents in passing through the liquid layer of the latter. In both cases, the liquefaction receptacle may be provided with a plurality of gas inlet pipes, one of which is fed with a combustible gas and the other with a combustion-assisting gas, the combustion taking place within the receptacle and serving to heat the latter. In addition, the liquefaction receptacle may comprise a tube situated on the outside, and connected on the one hand to the pipe for the admission of the current of gas and on the other hand to the pipe for the discharge of the current of gas, both being provided with adjustable closure means permitting a part of the current of gas to flow around the liquefaction receptacle, whereby it is possible for the current of gas charged with active product to be diluted with uncharged gas. This arrangement is interesting in the case where the vapour pressure of the substances to be vaporised is such that the essential current of gas carries away a quantity of active products exceeding the required quantity.

The device for making a controlled quantity of active product available to a current of gas comprises, for example, a fluid-tight closed hopper containing the active product in anhydrous and finely pulverized form, a worm disposed in the bottom of the hopper, and a motor with a reduction gear driving the worm at variable speed.

The conduits in which the current of gas flow are provided with heating means in order to bring these currents to the temperature necessary for avoiding disturbances in the calorific level in the vaporization chamber or chambers and in the liquefaction receptacle or receptacles for the active product, and for avoiding any effect of condensation of the active product in the currents of carrier gas, which calls for superheating of the said gas currents.

The devices for isolating the treatment zone from the adjacent zones comprise advantageously, on the one hand, a bank of nozzles disposed on the upstream side of the treatment zone and fed with a current of gas, preferably a current of inert gas, for the purpose of forming a screen or curtain which prevents the currents of treatment gas from penetrating into the adjacent zone, and on the other hand baffles disposed on the downstream side of the treatment zone, having the effect of constraining the currents of treatment gas to remain close to the surface of the object being treated while the latter is being cooled.

The apparatus employed for depositing electrically conductive coatings on the glass or ceramic surface, namely on glass sheets, may comprise one or more of the devices described, depending upon whether it is desired to use only one or a plurality of banks of nozzles, to charge one or more currents of gas with active product or with constituents of the latter, or to use solid anhydrous substances directly vaporized or previously converted to the liquid state. In the following table, a number of possibilities are given by way of example. Against the devices is given the number of such devices used for forming the apparatus (1, 2 or $x$, this letter designating any number between 2 and 6). The devices such as the reciprocating device incorporating the bank or banks of nozzles, the bank of nozzles for projecting the oxidizing gas, or for isolating the treatment zone, which are found only in one example of the apparatus, have been omitted from the table.

| Bank of nozzles | 1 | 1 | 2 | $x$ | 1 | 1 | 1 | 1 | $x$ | $x$ | 1 |
|---|---|---|---|---|---|---|---|---|---|---|---|
| Vaporization chamber | 1 | 1 | 1 | $x$ | 1 | ---- | 1 | ---- | $x$ | ---- | 1 |
| Liquefaction receptacle | ---- | ---- | 1 | ---- | 1 | 1 | $x$ | $x$ | $x$ | $x$ | 1 |
| Feed hopper | 1 | $x$ | 2 | $x$ | 1 | 1 | $x$ | $x$ | $x$ | $x$ | $x$ |

The combination according to the third column comprises a vaporization chamber and a liquefaction receptacle, each of these devices being provided with a feed hopper and being connected to a separate bank of nozzles, and in the combination according to the last column, the various hoppers feed one after the other, in accordance with a predetermined program, the liquefaction receptacle and the vaporization chamber.

A number of embodiments of the invention are illustrated by way of example in the accompanying drawings.

Figure 1:
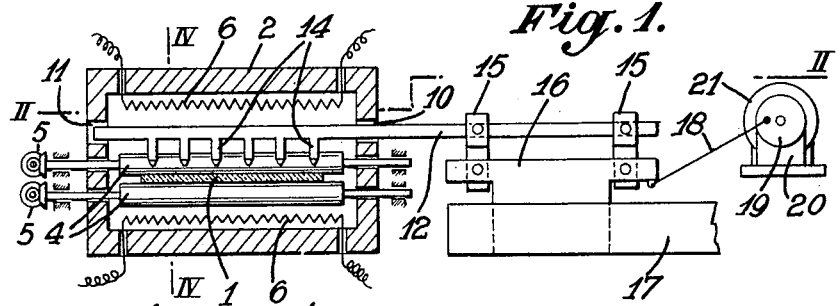
FIGURE 1 shows, in vertical section the diagram of a furnace for applying an electrically conductive coating to a glass sheet.

FIGURE 6 is a diagrammatic illustration of a device for vaporizing the active product.

FIGURE 7 shows diagrammatically a feed hopper in combination with a liquefaction receptacle.

FIGURE 8 shows diagrammatically a liquefaction rerecptacle connected to there servoir for an inert gas.

FIGURE 9 is a diagram of an installation comprising two liquefaction receptacles and one mixing chamber for the currents of inert gas charged with vapors formed of different constituents of the active product.

FIGURE 10 is a diagram of an installation comprising a branch conduit enabling a part of the inert gas to flow around the liquefaction receptacle, this diagram showing in addition a means for heating the conduits.

FIGURE 11 shows diagrammatically a device for the the injection of the liquefied active product into an evaporation chamber by means of inert gas.

FIGURES 12 and 13 illustrate various combinations of devices according to FIGURE 11, and FIGURE 14 is a diagrammatic section through that part of the furnace which serves for cooling the glass sheet provided with an electrically conductive coating.

The glass sheet 1 to be treated is introduced into a furnace 2, through which it travels in the direction of arrow 3 between rollers 4 resistant to high temperature, which consist, for example, of asbestos, and which are simultaneously driven by a motor through variable speed reduction gear and a series of pairs of gears 5. The furnace is heated, for example, by electric resistors 6 disposed at intervals to create two distinct zones separated from one another at 7, the first being the pre-heating chamber 8, and the second being the treatment chamber proper 9. In the pre-heating chamber 8, the temperature is adjusted to a value between 600° and 800° C. and the chamber 9 is so heated as to maintain the sheet 1 during the treatment at a temperature between 450° and 600° C. On leaving the treatment zone, the sheet is cooled in accordance with a predetermined treatment program. It is obvious that these thermal conditions can be produced by any other heating means, for example by an appropriate thermal insulation of the treatment chamber 9, the glass having been heated by any means before having been introduced into the chamber 9.

The treatment chamber 9 has apertures 10 and 11 which enable the conduits 12 and 13 feeding the treatment products to carry out reciprocating movements. These conduits are provided at their ends with banks of nozzles 14 for projecting the treatment products against the glass sheet 1. The apparatus illustrated in FIGURES 1 and 2 is designed for the treatment of a single face of the glass sheet, but it is obviously possible to treat both faces by doubling the members for the distribution of the treatment products. The reciprocating movement of the conduits 12 and 13 is obtained by fixing them to supports 15 mounted on a sliding block 16 moving between dovetailed slideways 17 perpendicularly to the direction of the translational movement of the glass sheet 1. The sliding block 16 is connected by a connecting rod 18 to a crank pin mounted in a disc 19 turning on a shaft of a variable speed reduction gear 20 driven by the motor 21. In this way, it is possible to impart to the sliding block 16, and consequently to the conduits 12 and 13, a reciprocating movement whose amplitude is adjusted by the mounting of the crank pin in the disc 19 at a chosen distance from the axis of rotation, and the frequency by the speed of rotation of the secondary shaft of the reduction gear 20. In accordance with the invention, various devices for controlling the reciprocation movement of the nozzles 14 may be employed, for example a cam system or any other appropriate arrangement.

Owing to the reciprocating movements, the treatment products projected through the nozzles 14 are distributed over the entire width of the glass sheet 1. The direction of the nozzles and of the jets may be adjusted on the supports 15 on which the conduits 12 and 13 are fixed in appropriate positions by locking screws 22 (FIGURE 3), and the length of the jet may be varied by modification of the height of these supports, the legs 23 of which are fixed in the sliding block 16 by means of screws 24. The impacts of the jets emanating from the nozzles 14 of the various conduits 12 and 13 can therefore be chosen as required. For example, in order to superpose the jets, the nozzles are made convergent as shown in FIGURES 4 and 5 in the case of two and four banks of nozzles and conduits 12, 13 and 12', 13' respectively, each of which is individually adjustable by means of two supports 15.

The treatment products of the invention comprise on the one hand the active product containing in general a plurality of substances as hereinbefore indicated, and on the other hand an oxidizing gas. The latter is preferably a current of oxygen emanating from a reservoir 25 provided with an adjusting valve 26. By flowing through a flexible pipe 27 to which a pressure gauge 28 is connected, the said current of oxygen reaches the bank of nozzles of the conduit 13. The active product comes from a chamber 29 in the form of vapour or gas in mixture with an inert carrier gas, and reaches the bank of nozzles of the conduit 12 through the flexible pipe 30. Suitable inert gases are, in particular, nitrogen, a rare gas such as argon, carbon dioxide, combustion gases free from water vapour, and combustible gases producing no water vapour during their combustion.

The active product is used in the anhydrous and finely pulverized state. It is disposed in a closed hopper 31 protected from moisture and insulated from the atmosphere. Disposed at the bottom of the hopper is a worm 32 driven by a motor 33 comprising a variable speed reduction gear 34 permitting of feeding any desired quantity of active product.

In the embodiment diagrammatically illustrated in FIGURE 6, the worm 32 introduces the active product into a vaporization chamber 35, to which is connected via a conduit 36 having a pressure gauge 37 and an adjustment valve 38 therein, an inert gas reservoir 39, for example a compressed nitrogen bottle. The vaporization chamber is heated from the outside, as symbolically indicated by the burner 40, to a temperature sufficient for the active product to be vaporized and carried along by the inert gas as it is introduced into the chamber, in which the path for the vapors and the inert gas is lengthened by baffles 41.

The substances forming the active product are fed either in intimate mixture through a single hopper 31 or through a plurality of hoppers, each of which then contains one or more of these substances. The various hoppers may be mounted on the same vaporization chamber 35, or each on a separate chamber, as illustrated in FIGURE 6, in which one part of the substances forming the active product is contained in the hopper 31 feeding the chamber 35 and the other part in the hopper 31' feeding the chamber 35'. The currents of gas charged with active product converge at 29 and are carried along together through the flexible duct 30 to the bank of nozzles of the conduit 12. Instead of converging at 29, the various currents of gas could alternatively pass separately through conduits 12 and 12', and be projected separately on to the part to be treated by corresponding banks of nozzles, as indicated in FIGURE 5, which also shows, as an alternative, multiple oxygen conduits 13 and 13'.

As hereinbefore explained, the direction of the jets and the distance between the nozzles and the glass to be treated are adjusted on the supports 15 and by the height of the legs 23 of the said supports (FIGURE 3), while the amplitude and frequency of the reciprocating movement are fixed at will by the choice of the distance separating the location of the crank pin on the disc 19 and by the speed of rotation of the latter. The conduits 12 and 13 being mounted on the same reciprocating device, their movements are obviously exactly synchronized, the nozzles 14 of the banks of the said conduits remain constantly in the same position relative to one another and a perfect adaptation of the jets of oxygen and active product is obtained. However, if desired, there would be nothing to prevent the amplitude and the frequency of the reciprocating movements being made independent for the various conduits 12 and/or 13 or for groups of these conduits and simply staggering the dead centre points of the banks of nozzles so as to correct the effects of inertia or any other disturbing factors.

In order to produce uniform electrically conductive coatings having the desired resistivity and free from fogging, it is desirable on the one hand to operate in accordance with the invention in anhydrous medium and on the other hand to effect appropriately all the adjustments of the apparatus which are essential for producing optimum conditions from the viewpoint of speed and regularity of the reactions on the glass surface by means of substances fed to the place of reaction without becoming disassociated during their conveyance. Thus, it has been observed that with a glass sheet advancing between the rollers 14 at a speed of 7 to 10 centimeteres per second and being cooled at a temperature between 450° and 600° C., the rate of flow of nitrogen per hour may be adjusted to 3 cubic metres, that of the mixture of substances forming the active product to about 1000 grams (variable in accordance with the resistivity of the electrically conductive coating to be produced), and that of oxygen to about 2 cubic metres. The distance between the mouths of the nozzles 14 and the glass surface is chosen at 3 centimetres and that between the conduits 12 and 13 at 5 centimetres. The speed of the current of nitrogen charged with active product in the vaporous state is of the order of 8 metres per second at a temperature of 550° C. in the tube 12, and 13 metres per second at the outlet from the nozzles 14, and the pressure of this current is 90 millimetres of water in the tube and about 75 millimetres at the outlet from the nozzles. The speed of the gas jets is considerably higher than that of the convection currents which normally exist in the furnace and the latter cannot modify the direction of the jets before they have touched the surface of the glass sheet.

Another embodiment of the invention arises out of the use of liquefaction receptacles for the active product or one or more of the constituents therefor.

The gas is introduced through a tube 43 into a receptacle 42 (FIGURE 7) heated by appropriate means, represented by a burner 40 in the figures, to a temperature at which the active product is in the molten state and possesses a substantial vapor pressure, the inert carrier gas being charged in the said receptacle with vapors of the product and leaving the receptacle through a conduit 44. The active product or one or more of its constituents is fed into the receptacle 42 through the closed hopper 31 comprising the worm 32 driven by the motor 33 through the variable speed reduction gear 34, in such manner that the quantity of liquefaction product situated in the receptacle remains substantially constant despite the extractions effected by the current of inert gas.

The liquefaction receptacles are all provided with at least one feed hopper 31, but this is omitted in some figures in order to simplify the diagrammatic drawings, namely in FIGURES 8, 9, 10 and 11.

Depending upon the level of the vapor pressure of the product at the chosen temperature of the receptacle, the tube 43 for the introduction of the inert gas is disposed above the level of the liquefied material 45, (FIGURE 7) or below this level, as shown in FIGURE 8 at 48, in order to require the inert gas to flow through the liquefied material and become charged with vapors, which ensures greater consistency of the gas mixture.

Figure 2:
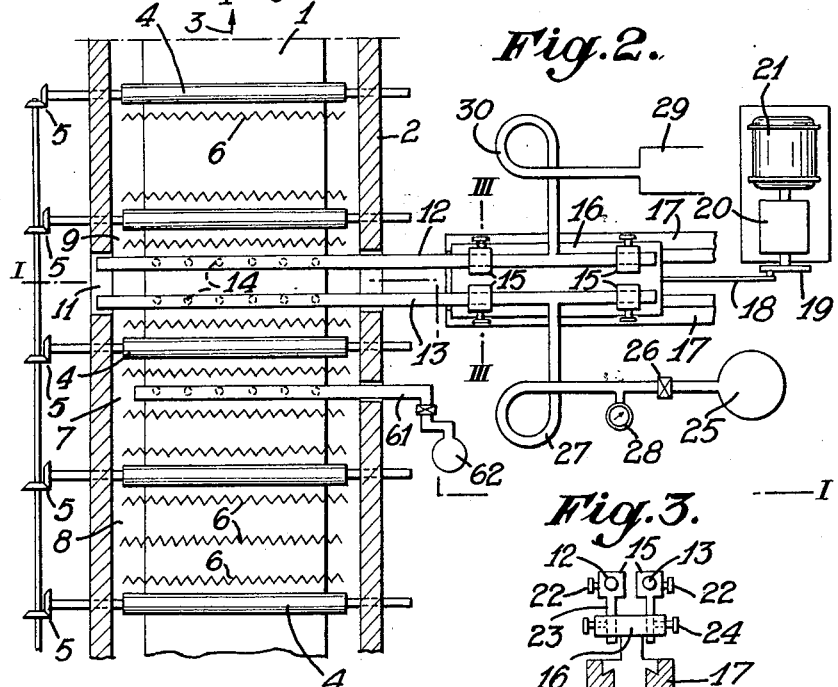
FIGURE 2 is a horizontal section along the line II—II of FIGURE 1.
Figure 3:
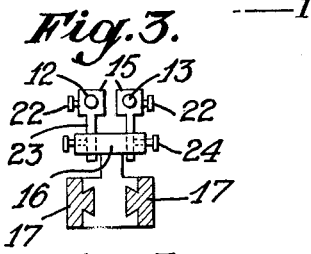
FIGURE 3 is a section along the line III—III of FIGURE 2.
Figure 4:
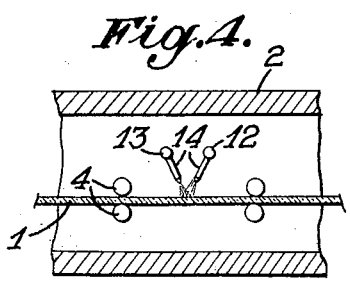
FIGURE 4 is a section along the line IV—IV of FIGURE 1.
Figure 5:
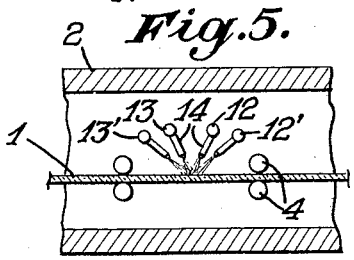
FIGURE 5 is a section similar to that of FIGURE 4 through an installation comprising four banks of nozzles.

FIGURE 9 diagrammatically illustrates an installation comprising two liquefaction receptacles 42 and 42' each containing part of the substances forming the active product. These receptacles are either of the type illustrated in FIGURE 7 or of the type illustrated in FIGURE 8. The inert gas is introduced into the said receptacles through conduits 48 and 48' with regulating valves 49 and 49', branched from a common reservoir 39, through a conduit 36 containing a pressure gauge 37 and a valve 38. The outlet conduits 50 and 50' open into a chamber 35 which may be provided with baffles as illustrated in FIGURE 6, and from which the mixture of vapors of the substances forming the active product and of inert gas is carried through 29 and 30 to the bank of nozzles of the conduit 12 (FIGURES 1 and 2). Since the quantity of inert gas necessary for forming jets travelling at the desired speed at the outlet from the nozzles 14 is sometimes greater than the quantity necessary for removing the required quantity of active product in the liquefaction receptacle, it is advantageous to provide a branch conduit 51 (FIGURE 10) with adjustment valves 52 and 53 connected on the one hand to the conduit extending from the reservoir 39 and on the other hand to the conduit 50 connecting the liquefaction receptacle with the chamber 35. Thus, that part of the inert gas current which is not required for the extraction of vapors of active product in the liquefaction receptacle 42 flows around the said receptacle and combines with the current of gas leaving the latter.

In order to avoid any condensation of vapors of active product during their travel with the current of inert gas, and any disturbance in the temperature conditions in the liquefaction receptacles or in the evaporation chambers by the arrival of cold gas, it is desirable to heat the gas conduits connecting the various devices of the apparatus, such as the conduits 43, 50 and 51, by means shown in FIGURE 10 as burners 47. In practice, the currents of gas are superheated so that their temperature between the outlet from the chamber 29 (FIGURES 2, 6 and 9) and the nozzles 14 remains above the temperature of the dew point of the vapors of active product.

Another embodiment is diagrammatically illustrated in FIGURE 11. A heated liquefaction receptacle 54 containing the active product of one or more of its constituents in the molten state is connected by a conduit 55 to an atomizer 56 which injects the molten material in the form of fine droplets into a chamber 57 heated by a means represented by the burner 40, in which chamber the droplets are converted into vapors which escape, together with the inert gas entering through 58 and actuating the atomizer 56, through the duct 59 heated as symbolically indicated by the burner 47. If the liquefaction receptacle 54 is fed with only one or more ingredients of the active product, the atomizers 58 of a plurality of receptacles may be mounted on a single chamber 57 (FIGURE 12) or the atomizers 56 and 56' may deliver into chambers 57 and 57' respectively (FIGURE 13). In the latter case, the conduits 59 and 59' may be connected together and the conduit 60 may feed a single bank of nozzles, or each of these conduits may be connected to a separate conduit 12.

The various devices hereinbefore described may be combined to vaporize the active product and to carry it by means of currents of inert gas towards the glass surface to be treated. The chosen combination depends upon the properties of the various substances forming the active product. Thus, for charging a current of gas of substances which are directly transformed from the solid state to the gaseous state by sublimation, such as ammonium chloride, or tellurium oxide or fluoride, use is preferably made of the vaporization chamber 35 with the hopper 31 (FIGURE 6). The hopper may be charged with a mixture containing a number of substances in appropriate proportions, provided that their sublimation temperatures do not differ excessively from one another; otherwise, it is preferable to provide a hopper and a vaporization chamber for each of the substances. The various currents of gas charged with their vapors are then brought to a sufficiently high temperature to obviate condensation of one of the substances when the currents converge in the chamber 29. This convergence must be avoided if a harmful reaction between the substances is possible, and if this is the case, there should be provided a conduit 12 with a bank of nozzles for each of the currents of gas carrying the vapors of the various substances.

The arrangement comprising the vaporization chamber 35 and the hopper 31 is also suitable for stannous chloride ($SnCl_2$), the melting point of which is about 250° C. The chamber 35 will be heated to a temperature of the order of 500° to 550° C. in order to reach a vapor pressure permitting the current of gas to become charged with vapors of stannous chloride.

The arrangement according to FIGURE 6 is therefore suitable for the vaporization of an active product formed of stannous chloride and of an adjuvant based on tellurium, the hopper 31 receiving finely pulverised anhydrous stannous chloride and the hopper 31' either tellurium fluoride or a mixture of tellurium oxide ($TeO_2$) and ammonium chloride, the former of which sublimes at about 450° C. and the second at about 335° C.

Since, however, the liquid phase of the stannous chloride extends over the temperature range from about 250° C. to about 620° C., there may very well be employed for its vaporization a liquefaction receptacle as illustrated in FIGURE 7, and the latter may be combined with a vaporization chamber 35 comprising a hopper 31 (FIGURE 6) for the adjuvant based on tellurium. The charged gas currents may be mixed or may arrive at the surface to be treated in the form of separate currents through conduits 12 comprising separate banks of nozzles.

The use of an injection device (FIGURE 11) is desirable above all in the case of constituents of low melting point, and therefore for anhydrous stannic chloride ($SnCl_4$) melting at −35° C., but it would also be suitable for stannous chloride.

The reaction zone 9 is isolated from the upstream zone 8 in which the glass sheet is heated by a curtain or screen 7 (FIGURE 2) consisting of an intermediate sheet of gas which is produced by means of a fixed conduit 61 with a bank of nozzles projecting a gas, preferably an inert gas, coming from a reservoir 62. This sheet of gas protects the reaction zone from the more or less turbulent gases of the heating zone and at the same time prevents the gas currents charged with active product from penetrating into the zone 8 and from reacting with the glass under ill-defined conditions inappropriate for the production of an adequately conductive coating free from fogging and streaking. In order to surround the glass which has travelled through the reaction zone by an atmosphere favorable to the final orientation of the particles constituting the electrically conductive coating, it is caused to travel during its cooling together with the gases which have been projected through the nozzles of the banks mounted on the conduits 12 and 13 and which still contain an excess of active product. The contact between these gases and the glass is promoted by baffles 63 (FIGURE 14) which are disposed across that part of the furnace which serves for the cooling of the glass advancing between the guide rollers 4. The inventors have observed that it is desirable to regulate the duration of contact between the treated glass and the gases. This duration must be between certain limits, which are variable in themselves with the operating conditions. The adjustment will therefore be effected by trial and error. For this purpose, the baffles 63 are mounted on hinges enabling them to be held fast in any inclined position (by means of locking screws, for example) in relation to the direction of travel of the glass.

Naturally, the invention is in no way limited to the embodiments which have been described and illustrated by way of example, and modifications may be made thereto without departing from its scope.

We claim:
1. In a process for the production of a transparent, stable, electrically-conductive coating on the surface of a glass sheet by applying to the surface thereof while heated an oxidizing gas, an active compound of an element selected from the group consisting of tin, antimony and tellurium and, exclusive of the active element, an adjuvant compound selected from the group consisting of ammonium, antimony and tellurium compounds, the improvement comprising carrying said active and adjuvant compounds as anhydrous vapors within an inert anhydrous carrier gas separated from said oxidizing gas until said application at said surface.

2. In a process for the production of a transparent, stable, electrically-conductive coating on the surface of a glass sheet by applying to the surface thereof while heated an oxidizing gas, an active halide of an element selected from the group consisting of tin, antimony and tellurium and exclusive of the active element an adjuvant compound selected from the group consisting of ammonium halides, antimony fluoride, tellurium fluoride, antimony oxide with ammonium fluoride and tellurium oxide with ammonium fluoride, the improvement comprising carrying said active and adjuvant compounds as anhydrous vapors within an inert anhydrous carrier gas separated from said oxidizing gas until said application at said surface.

3. An article of a composition selected from the group consisting of glass and ceramic coated with a transparent, stable, electrically-conductive coating by the process of claim 2.

4. The process of claim 2 wherein said carrier gas is selected from the group consisting of nitrogen, carbon dioxide, argon and neon.

5. The process of claim 2 wherein said oxidizing gas is provided by a current of oxygen directed on to said surface.

6. The process of claim 2 wherein said carrier gas contacts said surface while said surface is being slowly cooled after heating near the softening point.

7. The process of claim 6 wherein said surface is about 450 to 600° C. at said contact and said carrier gas remains adjacent said surface until said surface has cooled to about 150 to 350° C.

8. In a process for the production of a transparent, stable, electrically-conductive coating on the surface of a glass sheet by drawing said sheet through a chamber having a heating zone of 600 to 800° C., a treatment zone of 450 to 600° C., and a cooling zone of 150 to 350° C. and applying a tin halide vapor in an oxidizing atmosphere to said surface in said treatment zone in conjunction with an adjuvant compound vapor selected from the group consisting of antimony fluoride, tellurium fluoride, antimony oxide with ammonium fluoride and tellurium oxide with ammonium fluoride, the improvement comprising incorporating said vapors in an anhydrous condition within an anhydrous carrier gas in a non-oxidizing atmosphere, applying said vapors with said carrier gas by spraying within said treatment zone through nozzles that reciprocate transverse to the longitudinal axis of said glass sheet, said treatment zone having said oxidizing atmosphere and spraying an inert gas between said reciprocating nozzles and said heating zone to separate said heating zone from said treatment zone and to prevent turbulent convection currents from entering said treatment zone.

9. In an apparatus for producing a transparent, stable, electrically-conductive coating on the surface of a drawn glass sheet including means for drawing said sheet through a chamber, the improvement in combination therewith comprising means reciprocal transversely to the longitudinal movement of said glass sheet for spraying vapors of an active compound within a carrier gas on to said sheet to form said coating, means to incorporate said active vapors within said carrier gas, means for separately spraying an oxidizing gas on to said sheet near the point of spraying said active vapors, and means for spraying an inert gas upstream from the other spraying means on to said glass sheet to form a treatment chamber isolated from turbulent convection currents.

10. In an apparatus for producing a transparent, stable, electrically-conductive coating on the surface of a drawn glass sheet including means for drawing said sheet through a chamber, the improvement in combination therewith comprising means reciprocal transversely to the longitudinal movement of said glass sheet for spraying vapors of an active compound within a carrier gas on to said sheet to form said coating, means to incorporate said active vapors within said carrier gas, means for spraying an oxidizing gas on to said sheet near the point of spraying said active vapors, means for spraying an inert gas upstream from the other spraying means on to said glass sheet to form a treatment chamber isolated from turbulent convection currents, and means defining the downstream end of said treatment chamber spaced downstream from said other spraying means.

11. In a process for the production of a transparent, stable, electrically-conductive coating on the surface of an object of a composition selected from the group consisting of glass and ceramic by applying to the surface thereof while heated an oxidizing gas and an active compound of an element selected from the group consisting of tin, antimony and tellurium in an oxidizing medium, the improvement comprising carrying said active compound as an anhydrous vapor within an inert anhydrous carrier gas separated from said oxidizing gas until said application at said surface.

12. An article of a composition selected from the group consisting of glass and ceramic coated with a transparent, stable, electrically-conductive coating by the process of claim 11.

References Cited in the file of this patent

UNITED STATES PATENTS

| | | |
|---|---|---|
| 1,310,037 | Snelling | July 15, 1919 |
| 1,580,957 | Chaffee | Apr. 13, 1926 |
| 1,831,535 | Juers | Nov. 10, 1931 |
| 1,987,576 | Moers | Jan. 8, 1935 |
| 2,026,086 | Farncomb | Dec. 31, 1935 |
| 2,293,881 | Bailey | Aug. 25, 1942 |
| 2,394,633 | Pechukas et al. | Feb. 12, 1946 |
| 2,490,263 | Gaiser et al. | Dec. 6, 1949 |
| 2,581,957 | Jones | Jan. 8, 1952 |
| 2,692,836 | McAuley | Oct. 26, 1954 |
| 2,779,690 | Gaiser | Jan. 29, 1957 |
| 2,815,298 | Heffley | Dec. 3, 1957 |
| 2,898,496 | Clark | Aug. 4, 1959 |

FOREIGN PATENTS

| | | |
|---|---|---|
| 163,098 | Australia | May 30, 1955 |

OTHER REFERENCES

"Vapor-Plating," by Power et al., John Wiley & Sons, Inc., 1955, page 136.